UNITED STATES PATENT OFFICE.

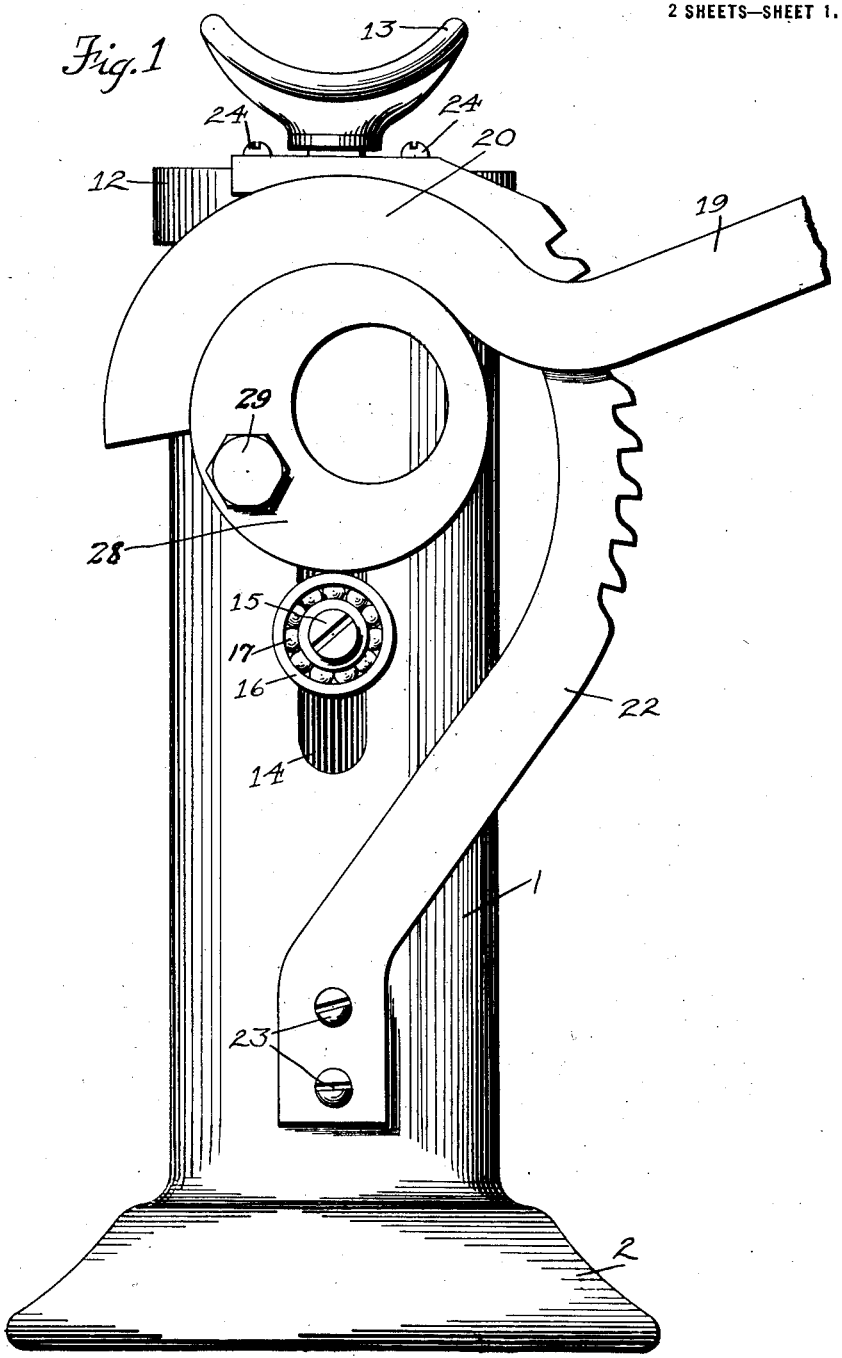

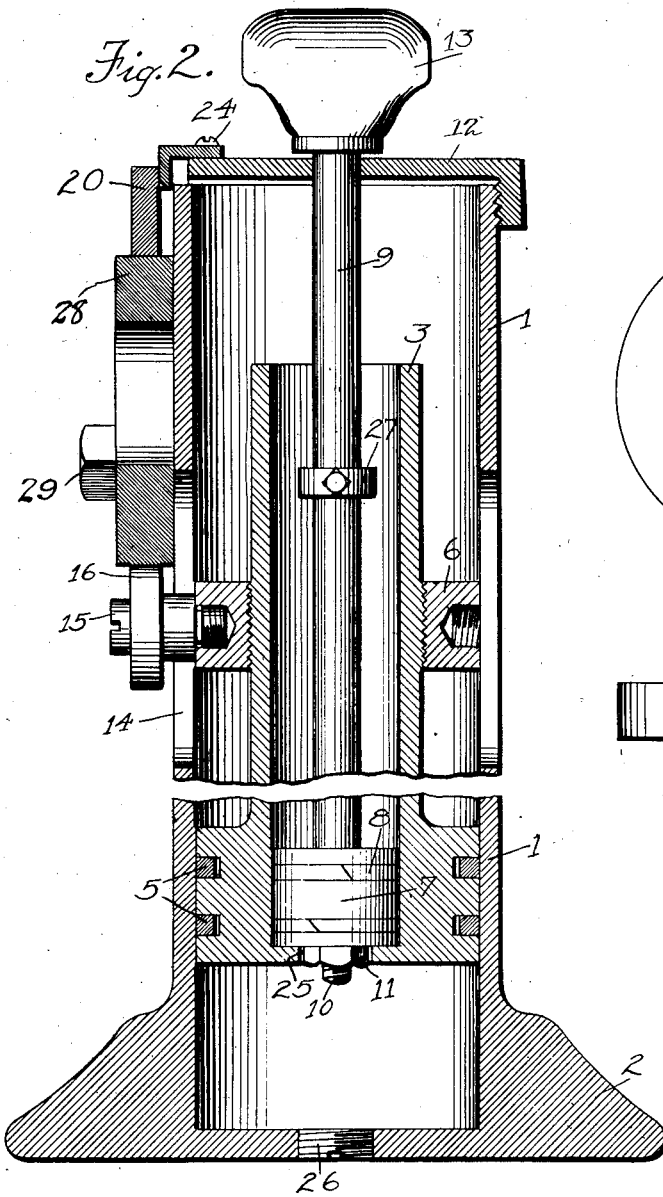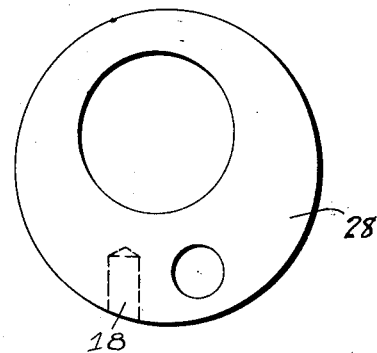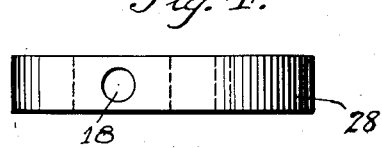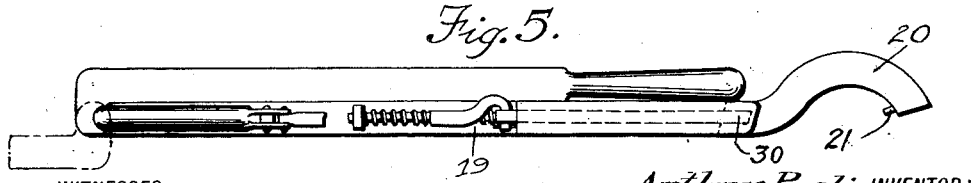

ARTHUR PAOLI, OF HANCOCK, MICHIGAN.

HYDRAULIC JACK.

1,344,711.  Specification of Letters Patent.  Patented June 29, 1920.

Application filed May 15, 1919. Serial No. 297,221.

*To all whom it may concern:*

Be it known that I, ARTHUR PAOLI, a citizen of the United States, and a resident of Hancock, in the county of Houghton and State of Michigan, have invented certain new and useful Improvements in Hydraulic Jacks, of which the following is a specification.

My invention is an improvement in hydraulic jacks, and has for its object to provide a jack of the character specified, small and compact of form, and especially adapted for use with motor vehicles, wherein a cylinder is provided having a base and a hollow piston movable in the cylinder and having movable therein another piston to which the saddle is connected, together with means for moving the hollow piston downward, to provide for a large amount of lift with small amount of controlling movement and without the use of valves or the like.

In the drawings:

Figure 1 is a side view of the improved jack;

Fig. 2 is a vertical section;

Fig. 3 is a front view of the cam;

Fig. 4 is an edge view;

Fig. 5 is a side view of the controlling lever.

In the present embodiment of the invention, a cylinder 1 is provided which, in addition to its function as a cylinder, is a casing for the working parts of the jack, and the cylinder has a suitable base 2. This cylinder is adapted to contain a liquid, as, for instance, glycerin or the like, and within the cylinder is movable a piston 3 which is hollow or provided with an axial bore, the said piston having its lower end enlarged, as shown at 4, and provided with packing rings 5, for making a fluid-tight joint between the cylinder and the piston. A ring 6 is threaded on to the hollow piston, the said ring acting as a guide in the vertical movement of the piston, and also acting to support engaging means for moving the piston downward, and to be presently described.

A piston 7 is arranged within the hollow piston, the said piston 7 having piston rings 8, and a stem or piston rod 9 is connected with the piston 7, the rod having a reduced stem 10 which is passed through the piston, and has a nut 11 threaded thereon. The piston rod 9 extends through the top of the cylinder, which is closed by a threaded cap 12, and a saddle 13 is connected with the top of the piston rod, the said saddle being rotatable on the rod.

The cylinder 1 is slotted vertically at diametrically opposite points, as indicated at 14, and at each slot the ring 6 is provided with threaded openings for receiving screws 15. The screw may be engaged with either opening of the ring, and the screw is a journal pin upon which is journaled a wheel or roller 16, a ball bearing 17 being interposed between the roller and the screw. A cam 28 is journaled on the cylinder at 29 at the upper end of that slot through which the screw extends, and the cam has radial openings 18.

A lever 19 is provided for operating the cam. The said lever has a curved portion 20 shaped to fit about the cam and having a pin 21 at its end for engaging one of the openings 18. When the pin is engaged with an opening, with the curved portion 20 embracing the cam, a downward movement of the free end of the lever will rotate the cam, and the cam will move the roller 16 downward, carrying with it the hollow piston.

It will be obvious that two cams and two rollers may be used if desired, and with heavy duty jacks two cams and two rollers may be used. For ordinary purposes a single cam and roller is sufficient.

The lever has latch mechanism, indicated at 30, and this mechanism engages the teeth of a ratchet bar 22 which is secured to the cylinder at 23 and to the cap at 24. But a single stroke of the lever is necessary to lift the saddle to its highest position and, in fact, but a single stroke can be used, because there is nothing to hold the piston elevated except the engagement of the lever latch mechanism and the ratchet bar.

In operation, the jack, with the internal parts in the position shown in Fig. 2. is placed beneath the article to be raised, with the saddle 13 engaging the said article, as, for instance, the axle housing of a motor vehicle. The lever 19 is engaged with the cam, and the outer end of the lever is pressed downward. The hollow piston is moved downward in the cylinder and the liquid held within the cylinder is forced upwardly through the opening 25 in the bottom of the hollow piston. This liquid drives up the piston 7, lifting the saddle and the parts supported thereby. The port 25 is always open, being shown in the present instance as a reduced port, but it is obvious that it might be the full diameter of the hollow piston.

It will be obvious that a slight downward movement of the hollow piston will result in a considerable movement of the piston 7. In operating the jack, the full downward movement of the lever lifts the saddle to its highest position, and the height to which the saddle is lifted is gaged by the extent of the downward movement of the lever. Whenever the saddle is lifted high enough, its motion may be checked by stopping the movement of the lever. Thus the saddle may be lifted and held in any desired position between completely lowered and completely lifted. Referring to Figs. 1 and 3, it will be seen that the cams are not pivoted directly above the rollers, but laterally with respect thereto, to increase the leverage.

Referring to Fig. 2, it will be seen that there is provided a filling opening in the bottom of the cylinder 1, normally closed by a threaded plug 26. A stop collar 27 is arranged on the rod 9 for engaging the cap 12 to limit the upward movement of the piston 7, and this collar may be adjusted wherever desired.

It will be evident that applicant's improved jack comprises a cylinder, a piston 3 having an axial bore opening at the inner end of the piston, and a second piston 7 movable in the bore.

I claim:

1. A hydraulic jack comprising a cylinder having its lower end closed, a hollow piston movable in the cylinder and having an open port in its lower end, said cylinder being adapted to contain liquid, a piston movable in the hollow cylinder and carrying a saddle at its upper end, and means for forcing the hollow piston downward to raise the other piston, said means comprising rollers connected with the hollow piston and rotating on axes radial to the piston, cams journaled on the cylinder and engaging the rollers, and means for rotating the cams, said rotating means comprising a lever having a curved portion provided with an opening, the cams having radial openings for engagement by the pin, and a ratchet bar secured to the cylinder, the lever having a pawl for engaging the ratchet bar.

2. A hydraulic jack comprising a cylinder having its lower end closed, a hollow piston movable in the cylinder and having an open port in its lower end, said cylinder being adapted to contain liquid, a piston movable in the hollow cylinder and carrying a saddle at its upper end, and means for forcing the hollow piston downward to raise the other piston, said means comprising rollers connected with the hollow pistons and rotating on axes radial to the piston, cams journaled on the cylinder and engaging the rollers, and means for rotating the cams.

3. A hydraulic jack comprising a cylinder having its lower end closed, a hollow piston movable in the cylinder and having an open port in its lower end, said cylinder being adapted to contain liquid, a piston movable in the hollow piston and carrying a saddle at its upper end, and means for forcing the hollow piston downward to raise the other piston.

4. In a hydraulic jack, the combination with the cylinder and the piston movable therein, of means for moving the same, said means comprising rollers connected with the piston, cams journaled on the cylinder and engaging the rollers, said cams having radial openings, and a lever having a curved portion fitting the cam and a pin for engaging an opening, the lever having latch mechanism and the cylinder having a ratchet bar for engagement by the latch mechanism.

5. In a hydraulic jack, the combination with the cylinder and the piston movable therein, of means for moving the same, said means comprising rollers connected with the piston, cams journaled on the cylinder and engaging the rollers, said cams having radial openings, and a lever having a curved portion fitting the cam and a pin for engaging an opening.

6. A hydraulic jack comprising a cylinder, a hollow piston movable therein and open at its bottom, a piston in the hollow piston and carrying a saddle at its upper end, means for forcing the hollow piston downward, and means in connection with the forcing means for holding the piston in adjusted position.

7. A hydraulic jack comprising a cylinder, a hollow piston movable therein and open at its bottom, a piston in the hollow piston and carrying a saddle at its upper end, and means for forcing the hollow piston downward.

8. A hydraulic jack comprising a cylinder, a piston movable therein and having a bore opening at the inner end of the cylinder, a second piston movable in the bore, and means for moving the first named piston into the cylinder to force the second piston outward.

9. A hydraulic jack comprising a cylinder, a piston movable therein and having a longitudinally extending bore, a second piston movable in the bore, said bore having an open communication at its inner end with that portion of the cylinder between the said first named piston and the inner end of the cylinder.

ARTHUR PAOLI,